United States Patent
Moore et al.

(10) Patent No.: US 10,444,252 B2
(45) Date of Patent: Oct. 15, 2019

(54) METHOD FOR OPERATING A MOTOR VEHICLE HAVING A START/STOP SYSTEM

(71) Applicant: Ford Global Technologies, LLC, Dearborn, MI (US)

(72) Inventors: Ian Moore, Pulheim (DE); Matthias Baumann, Cologne (DE); Christian Schmaler, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/184,408

(22) Filed: Jun. 16, 2016

(65) Prior Publication Data

US 2016/0369726 A1 Dec. 22, 2016

(30) Foreign Application Priority Data

Jun. 17, 2015 (DE) .......................... 10 2015 111 18

(51) Int. Cl.
| | |
|---|---|
| *B60T 7/12* | (2006.01) |
| *G01P 3/44* | (2006.01) |
| *B60T 17/22* | (2006.01) |
| *B60T 13/66* | (2006.01) |
| *F02N 11/08* | (2006.01) |
| *G01P 13/00* | (2006.01) |

(52) U.S. Cl.
CPC ................ *G01P 3/44* (2013.01); *B60T 7/122* (2013.01); *B60T 13/662* (2013.01); *B60T 17/22* (2013.01); *F02N 11/0837* (2013.01); *G01P 13/00* (2013.01); *B60T 2201/06* (2013.01); *F02N 2200/0801* (2013.01); *F02N 2200/0803* (2013.01); *F02N 2200/0807* (2013.01); *F02N 2200/124* (2013.01); *Y02T 10/48* (2013.01)

(58) Field of Classification Search
CPC ........ G01P 3/44; G01P 13/00; F02N 11/0837; F02N 2200/0801; F02N 2200/0803; F02N 2200/124; B60T 13/662; B60T 7/122; B60T 17/22; B60T 2201/06
See application file for complete search history.

(56) References Cited

U.S. PATENT DOCUMENTS

| | | |
|---|---|---|
| 4,402,286 A | 9/1983 | Pagel et al. |
| 6,404,072 B2 * | 6/2002 | Onoyama .............. B60K 6/485 |
| | | 290/40 A |

(Continued)

FOREIGN PATENT DOCUMENTS

DE 201014215542 A1 2/2015

*Primary Examiner* — David Hamaoui
(74) *Attorney, Agent, or Firm* — Raymond L. Coppiellie; Burgess Law Office, PLLC

(57) ABSTRACT

A method for operating a motor vehicle having an internal combustion engine, a service brake, a brake booster, a parking brake, a wheel-speed sensor and an inclination sensor is disclosed. The method including measuring the speed of motor vehicle using the wheel-speed sensor to create a speed signal. An inclination of the motor vehicle with respect to the direction the motor vehicle is sensed and an angle signal is created. The internal combustion engine is started when the speed measured is greater than zero and the inclination of the motor vehicle is greater than a predetermined value, such that the internal combustion engine creates a partial vacuum to power the brake booster to assist with the operation of the service brake.

8 Claims, 2 Drawing Sheets

(56) References Cited

U.S. PATENT DOCUMENTS

| | | | | |
|---|---|---|---|---|
| 7,890,243 B2* | 2/2011 | Abendroth | .......... | F02N 11/0818 |
| | | | | 123/179.3 |
| 8,574,125 B2* | 11/2013 | Nedorezov | ........... | F02D 41/065 |
| | | | | 477/169 |
| 8,989,992 B2 | 3/2015 | Lippok | | |
| 9,067,585 B2* | 6/2015 | Shimoyama | ............. | B60K 6/48 |
| 9,127,765 B2* | 9/2015 | Eto | ....................... | B60W 20/40 |
| 9,457,811 B2* | 10/2016 | Yu | ......................... | B60W 10/06 |
| 9,701,312 B2* | 7/2017 | Jensen | ............ | B60W 30/18018 |
| 2008/0283325 A1* | 11/2008 | Kodama | ............ | B60G 17/0164 |
| | | | | 180/243 |
| 2013/0000296 A1* | 1/2013 | Crombez | ................ | B60T 13/52 |
| | | | | 60/547.1 |
| 2013/0179053 A1* | 7/2013 | Matsunaga | ........... | B60W 10/02 |
| | | | | 701/112 |
| 2013/0204512 A1* | 8/2013 | Mizuno | .................. | F02D 45/00 |
| | | | | 701/112 |

* cited by examiner

METHOD FOR OPERATING A MOTOR VEHICLE HAVING A START/STOP SYSTEM

CROSS-REFERENCE TO RELATED APPLICATIONS

Not Applicable.

BACKGROUND OF THE INVENTION

1. Field of the Invention

The invention relates to a method for operating a motor vehicle having a start/stop system; and, more specifically to a method for restarting an engine based on a road grade.

2. Description of Related Art

Start/stop systems, also called start/stop or stop-start systems, are systems operating automatically to reduce fuel consumption in motor vehicles when in stationary phases (for example, during a stop at traffic lights), typically encountered during operation in urban environments. There are situations during these operations when the motor vehicle is on a road section of considerable grade, for example with a steep gradient of more than 15%. When the start/stop system has switched the internal-combustion engine off and the motor vehicle is at a standstill on such a steep gradient the driver of the motor vehicle may actuate the brake of the motor vehicle to prevent undesirable rolling of the motor vehicle on the road section.

A brake booster may be incorporated in the design of the motor vehicle to assist the driver by minimizing the actuating force required to achieve the desired braking action. In motor vehicles having an internal-combustion engine and, in particular, a spark-ignition engine, a partial vacuum arises in the induction manifold in the direction of flow downstream of a throttle valve of the internal-combustion engine. This partial vacuum serves as operating energy for the brake booster. A vacuum pump is another way to generate a partial vacuum. A leak in the connecting line between the check valve, which is a standard safety device in the vacuum line, and the brake booster, or a leak in the brake booster itself, may cause the partial vacuum rising to a value below a threshold value for a reliable operation of the brake booster.

In motor vehicles with a brake booster, the start/stop system may generate a start signal for implementing an automatic start of the engine when the partial vacuum level present in the brake booster is not sufficient. A pressure sensor monitors the partial vacuum value or a partial-vacuum estimator estimates the partial-vacuum value. Leaks in the connecting line or in the brake booster cannot be registered with a partial-vacuum estimator of such a type.

SUMMARY OF THE INVENTION

A method for operating a motor vehicle having an internal combustion engine, a service brake, a brake booster, a parking brake, a wheel-speed sensor and an inclination sensor is disclosed. The method begins with measuring the speed of motor vehicle using the wheel-speed sensor to create a speed signal. An inclination of the motor vehicle in the direction the motor vehicle is sensed and an inclination signal is created. The internal combustion engine is started when the speed measured is greater than zero and the inclination of the motor vehicle is greater than a predetermined value, such that the internal combustion engine creates a partial vacuum to power the brake booster to assist with the operation of the service brake.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
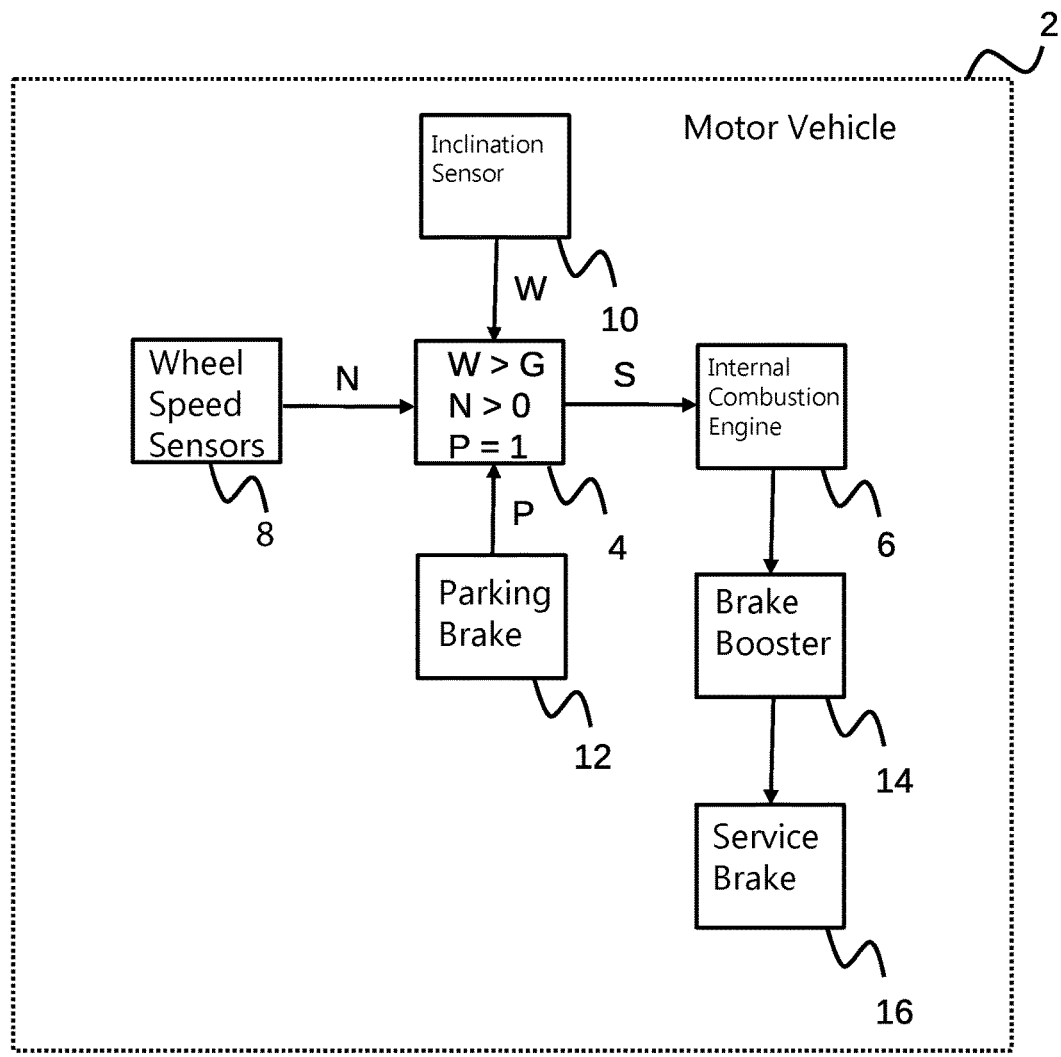
FIG. 1 is a schematic representation of a motor vehicle with a start/stop system and further components.

FIG. 1 shows, in schematic representation, various components of a motor vehicle 2, for example an automobile.

The components represented in the present exemplary embodiment are a start/stop system 4, an internal-combustion engine 6, a set of wheel-speed sensors 8, an inclination sensor 10, a parking brake 12, a brake booster 14, and a service brake 16.

The start/stop system 4 is a system for reducing fuel consumption of the motor vehicle, which during stationary phases—for example, during a stop at traffic lights—switches the internal-combustion engine 6 off to reduce fuel consumption. To start the internal-combustion engine 6, the start/stop system generates a start signal S supplied to the internal-combustion engine 6 and causes the internal-combustion engine 6 to start.

The internal-combustion engine 6 in the present exemplary embodiment is a spark-ignition engine with a throttle valve for setting the power, and, supplies the brake booster 14 with operating energy. A vacuum pump for supplying the brake booster 14 with operating energy may also be included with the internal-combustion engine 6. In the present exemplary embodiment, a wheel-speed sensor 8, assigned to each wheel of the motor vehicle, registers a rotational speed N of the respective wheel of the motor vehicle and supplies the rotational speed to the start/stop system 4. It should be appreciated by those skilled in the art that one wheel-speed sensor 8 can be used on a single wheel of the motor vehicle if so designed.

The inclination sensor 10 registers an inclination W of the motor vehicle 2, which is based on an inclination of a road section toward travel of the motor vehicle 2.

The parking brake 12 operates to lock one wheel, a group of wheels, or several wheels of the motor vehicle 2, so the motor vehicle 2 can be parked without rolling undesirably. If the parking brake 12 has been activated, locking at least one wheel of the motor vehicle 2, then the parking brake 12 transmits a parking-brake activation signal P (P=1) to the start/stop system 4. Otherwise, the parking-brake activation signal P is zero (P=0).

The service brake 16 reduces the vehicle speed in the direction of travel during operation of the motor vehicle 2.

To reduce the force expended by the driver on the brake pedal to actuate the service brake 16, the brake booster 14 boosts the actuating force of the brake pedal. The brake booster needs operating energy, in the form of a partial vacuum. In the present exemplary embodiment, the partial vacuum is made available by the internal-combustion engine 2, taking the form of a spark-ignition engine, in which a partial vacuum arises in the induction manifold in the direction of flow downstream of a throttle valve of the internal-combustion engine 2.

Here, a vehicle speed greater than zero or above a limiting value in the forward or reverse direction will be understood as a movement of the motor vehicle in the longitudinal direction of the vehicle. If movement of the motor vehicle is registered, a start of the internal-combustion engine is demanded, to offset any loss of partial vacuum due to a possible leak providing additional partial vacuum as needed to boost the pedal force of the driver of the motor vehicle. Automatically starting the internal-combustion engine makes available additional or sufficient partial vacuum to compensate for any loss of partial vacuum by a leak. If a leak exists an increase in partial vacuum for operating the brake booster is provided enabling a driver of the motor vehicle to stop or hold his/her motor vehicle on a road section with the service brake.

The start/stop system 4 considers and evaluates the wheel speed N, the parking-brake activation signal P and the inclination W. If the wheel speed N is zero at a preceding registration time and greater than zero at the current registration time; the parking-brake activation signal P is logical zero (parking brake not applied); and, the inclination W is greater than a limiting value G then the start/stop system 4 generates the start signal S which brings about a start of the internal-combustion engine 2.

Alternatively or additionally, in order to enhance the accuracy and reliability of the determination of a movement of the motor vehicle 2 in the direction of travel, there may be provision to read out and evaluate a holding-state function of the motor vehicle 2 and/or a speed of the motor vehicle 2, measured with a speedometer.

Figure 2:
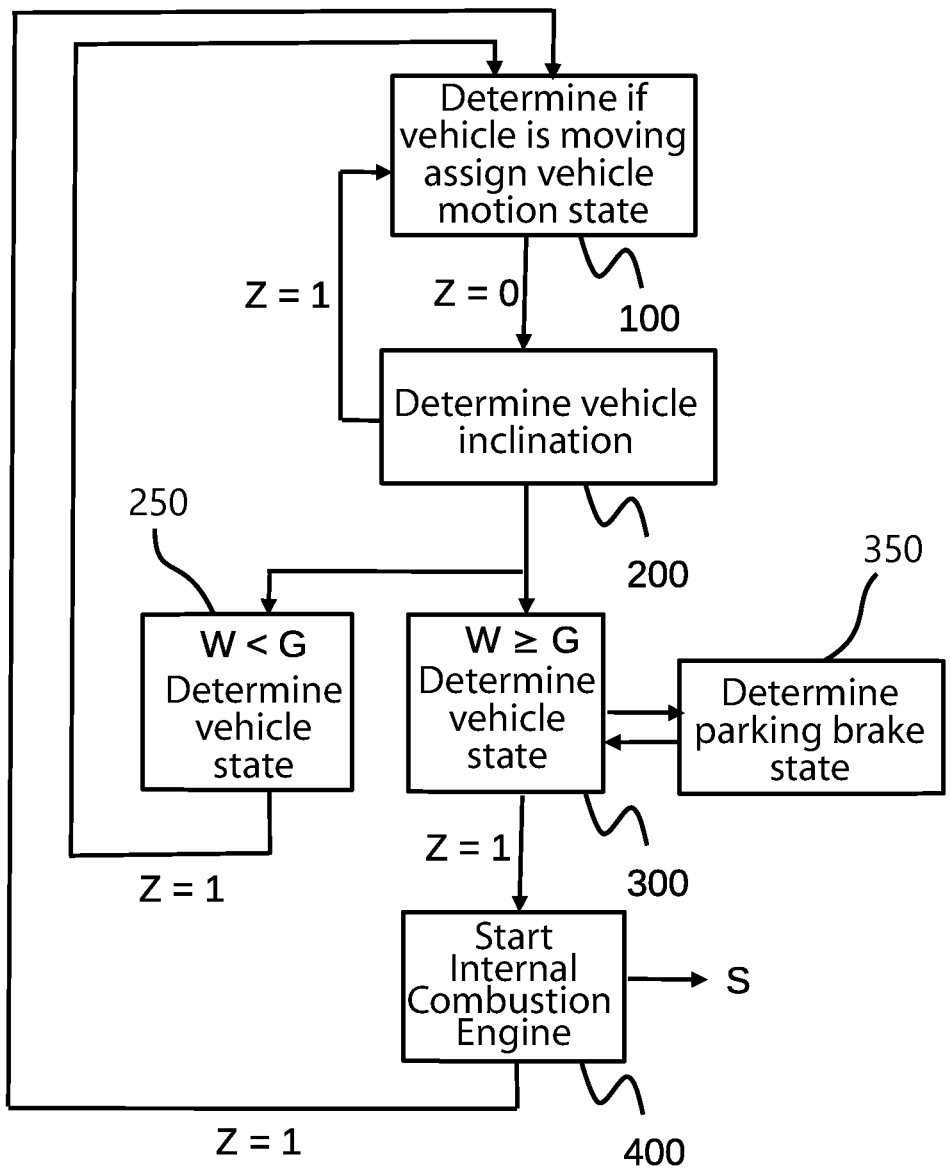
FIG. 2 is a flow chart of an exemplary embodiment of a method according to the invention schematic drawing of one embodiment of the invention for a motor vehicle.

Referring to FIG. 2, an exemplary embodiment of a method for operating the motor vehicle 2 having the start/stop system 4 will now be described. Initially, signals from a set of wheel-speed sensors of the motor vehicle are read and evaluated to determine movement of the motor vehicle. The set of wheel-speed sensors may include several incremental sensors, which can be used for determining wheel speed. The wheel sensors emit one pulse per step (angle increment). These pulses are used to ascertain the speed of the vehicle. The signals of the set of wheel-speed sensors are supplied to various systems of the motor vehicle, such as an anti-lock braking system, a traction control system, an electronic stabilization program, or a navigation system of the motor vehicle. Use is consequently made of already existing components, reducing the manufacturing effort, whereby with the set of wheel-speed sensors provide a mechanism to determine whether the motor vehicle is moving or stationary.

In step 100, the method ascertains whether the motor vehicle 2 is moving in the direction of travel and assigns a motion state variable Z. The motor vehicle 2 has a value of logic one (Z=1) for a moving motor vehicle 2. If the motor vehicle 2 is stationary, the motion state variable Z has the value logic zero (Z=0).

The method moves to step 200 when the motion state variable has a logic value zero (Z=0) as the vehicle is now stationary. When the motor vehicle 2 moves, the motion state variable Z is again set to the value logic one (Z=1) for a moving motor vehicle 2. When the motion state variable has a logic value one (Z=1) the method returns to step 100. Determination of the motion state may be made by evaluation of the rotational speed N determined by the set of wheel-speed sensors 8. If the rotational speed N is greater than zero, a moving motor vehicle 2 is concluded.

Alternatively or additionally, in order to enhance the accuracy and reliability of determining a movement of the motor vehicle 2 in the direction of travel, there may be provision to read out and evaluate the holding-state function of the motor vehicle 2 and/or the speed of the motor vehicle 2.

When the vehicle state is stationary, in step 200, the method determines the inclination of the motor vehicle in the longitudinal direction of the vehicle. The inclination compared with a limiting value, and wherein the start signal is generated if the inclination is greater than the limiting value. An automatic start of the internal-combustion engine is carried out only when a corresponding braking force, boosted by the brake booster, is required to arrest the motor vehicle on a road section with a gradient.

In step 200, the inclination W of the road section on which the motor vehicle 2 is located is determined with the inclination sensor 10 and compared with a limiting value G. The limiting value G may have values between 10% and 20%. In the present exemplary embodiment, the limiting value has a value of 15%. An automatic start of the internal-combustion engine is executed only when, due to the magnitude of the gradient, a downhill force that is greater than the breakaway torque of the motor vehicle on the road section with a gradient is acting on the motor vehicle, so the motor vehicle would roll automatically.

If the inclination W is less than the limiting value G, in a step 250 the state variable Z is again set to logical one (Z=1) when the motor vehicle is moving again and the method continues with step 100.

In the present exemplary embodiment, the limiting value has a value of 15%. When the inclination W is greater than the limiting value G. Then, in a further step 350, the parking-brake activation signal P from the parking brake 12 is queried and read in.

If the parking-brake activation signal P is logical one (P=1), the parking brake 12 has been activated, in step 300 the parking-brake activation signal P is set to the value logic one (P=1), and step 350 becomes active wherein the parking brake is on. No restart of the engine is demanded, so long as the parking brake 12 has been activated.

Because of setting the parking-brake activation signal P to logic one (P=1), in step 400 the generation of the start signal S is suppressed, so long as the parking-brake activation signal P has been set to logic one (P=1). If the parking brake 12 has been activated, this represents a non-moving motor vehicle. The state describes that the driver of the motor vehicle is taking control with the parking brake 12 and holding the motor vehicle. Here, the motor vehicle may move slightly without the internal-combustion engine being started.

If, the parking-brake activation signal P is logical zero (P=0), the parking brake 12 has not been activated, and a movement of the vehicle in the longitudinal direction of the vehicle was detected, the state variable Z is set to the logic value one (Z=1), and step 400 becomes active. Thereupon the start signal S is generated which brings about a start of the internal-combustion engine 6 if a movement of the motor vehicle is registered.

Start-up of the internal-combustion engine 6, generates a partial vacuum in the induction manifold of the internal-combustion engine 6, which compensates for a possible loss of partial vacuum due to a leak in a connecting line between the internal-combustion engine 6 and the brake booster 16, or a leak of the brake booster 16 itself, so an assisting or sufficient partial vacuum is provided for operating the brake booster 16.

Also with a leak, an assisting or sufficient partial vacuum is provided for operating the brake booster, with which a driver of the motor vehicle can arrest his/her motor vehicle on a road section with the service brake.

As a reaction to the generating of the start signal S, the state variable Z is set to the value logic one (Z=1) for a moving motor vehicle 2, so the initial situation in step 100 has again been attained.

A movement of the motor vehicle can be read out and evaluated with a holding-state function of the motor vehicle, or a speed of the motor vehicle is registered with a speedometer of the motor vehicle, and evaluated.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for operating a motor vehicle having an internal combustion engine, a service brake, a brake booster, a parking brake, a wheel-speed sensor and an inclination sensor, the method comprising the steps of:
    measuring a speed of the motor vehicle using the wheel-speed sensor to create a speed signal;
    using the speed signal to determine whether the motor vehicle is in a stationary state;
    when the motor vehicle is in said stationary state, using the inclination sensor to create a stationary state inclination signal representing an inclination of the motor vehicle in a longitudinal direction of the motor vehicle in said stationary state;
    establishing a predetermined inclination limiting value and comparing said stationary state inclination signal with said predetermined inclination limiting value and determining when said stationary state inclination signal exceeds said predetermined inclination limiting value;
    starting the internal combustion engine and creating a partial vacuum to power the brake booster to assist with the operation of the service brake when said stationary state inclination signal exceeds said predetermined inclination limiting value and said motor vehicle exits the stationary state.

2. A method as set forth in claim 1 wherein the predetermined inclination limiting value is between 10% and 20%.

3. A method as set forth in claim 2 wherein the predetermined inclination limiting value is 15%.

4. A method as set forth in claim 2 including the step of identifying whether the parking brake is active or inactive.

5. A method as set forth in claim 4 wherein the step of starting the internal combustion engine is suppressed when the parking brake is activated.

6. A method as set forth in claim 1 wherein said engine starts independent of any signal from a pressure sensor monitoring a partial vacuum of the brake booster.

7. A method for operating a motor vehicle having a start/stop system, an internal combustion engine, a service brake, a brake booster, a parking brake, a wheel-speed sensor and an inclination sensor the method comprising the steps of:
    determining whether the motor vehicle is stationary based on a wheel-speed sensor signal;
    determining whether the start/stop system has stopped operation of the internal combustion engine;
    determining a motor vehicle inclination in a longitudinal direction of the motor vehicle based on an inclination sensor signal when the motor vehicle is stationary and the start/stop system has stopped operation of the internal combustion engine;
    establishing a predetermined inclination limiting value;
    comparing said motor vehicle inclination with said predetermined inclination limiting value and determining when said inclination sensor signal exceeds said predetermined inclination limiting value; and
    starting operation of the internal combustion engine when the motor vehicle is no longer stationary and the motor vehicle inclination exceeds said predetermined inclination limiting value wherein the internal combustion engine creates a partial vacuum to power the brake booster to assist with the operation of the service brake.

8. A method as set forth in claim 7 wherein the step of starting said engine occurs independent of a partial vacuum level present in the brake booster.

* * * * *